US012525399B2

(12) United States Patent
Zheng et al.

(10) Patent No.: US 12,525,399 B2
(45) Date of Patent: Jan. 13, 2026

(54) GLASS-PACKAGED CERAMIC FEED-THROUGH FILTER AND PREPARATION METHOD THEREFOR

(71) Applicant: FUJIAN OUZHONG ELECTRONICS CO., LTD, Fuzhou (CN)

(72) Inventors: Chaoyong Zheng, Fuzhou (CN); Bin Ye, Fuzhou (CN)

(73) Assignee: FUJIAN OUZHONG ELECTRONICS CO., LTD, Fuzhou (CN)

(*) Notice: Subject to any disclaimer, the term of this patent is extended or adjusted under 35 U.S.C. 154(b) by 283 days.

(21) Appl. No.: 18/549,705

(22) PCT Filed: Apr. 13, 2022

(86) PCT No.: PCT/CN2022/086566
§ 371 (c)(1),
(2) Date: Mar. 1, 2024

(87) PCT Pub. No.: WO2022/218332
PCT Pub. Date: Oct. 20, 2022

(65) Prior Publication Data
US 2024/0203653 A1 Jun. 20, 2024

(30) Foreign Application Priority Data
Apr. 14, 2021 (CN) .......................... 202110400663.2

(51) Int. Cl.
H01G 4/224 (2006.01)
H01G 4/30 (2006.01)
H01G 4/35 (2006.01)

(52) U.S. Cl.
CPC ............... *H01G 4/224* (2013.01); *H01G 4/30* (2013.01); *H01G 4/35* (2013.01)

(58) Field of Classification Search
CPC ............ H01G 2/103; H01G 4/35; H01G 4/30; H01G 4/224
See application file for complete search history.

(56) References Cited

U.S. PATENT DOCUMENTS 4,148,003 A * 4/1979 Colburn .................. H01G 4/35
361/302
4,314,213 A * 2/1982 Wakino .................... H01G 4/35
333/182

(Continued)

FOREIGN PATENT DOCUMENTS

CN 210780697 U * 6/2020

*Primary Examiner* — David M Sinclair
(74) *Attorney, Agent, or Firm* — Westbridge IP LLC

(57) ABSTRACT

Disclosed are a glass-packaged ceramic feedthrough filter and a preparation method thereof, which includes a guide needle and a metal shell sleeved in the middle of the guide needle; the bottom of the metal shell is encapsulated by a glass body; a gasket sleeved on the guide needle is arranged above the glass body; a disc-shaped multilayer ceramic capacitor is sleeved on the guide needle above the gasket; a first gap is formed between the bottom of the disc-shaped multilayer ceramic capacitor and the top of the glass body; a second gap is formed between the capacitor and the inner wall of the metal shell; and the first gap is communicated with the second gap. The size of the first gap is increased through the gasket, a second gap is reserved between the capacitor and the metal shell, so that the first gap is communicated with the second gap.

16 Claims, 2 Drawing Sheets

(56) References Cited

U.S. PATENT DOCUMENTS

| | | | | |
|---|---|---|---|---|
| 5,999,398 A | * | 12/1999 | Makl | A61N 1/3754 361/309 |
| 2009/0059468 A1 | * | 3/2009 | Iyer | A61N 1/3754 29/877 |
| 2019/0192862 A1 | * | 6/2019 | Seitz | H01G 4/224 |

* cited by examiner

GLASS-PACKAGED CERAMIC FEED-THROUGH FILTER AND PREPARATION METHOD THEREFOR

CROSS-REFERENCE TO RELATED APPLICATIONS

This application is a national stage of International Application No. PCT/CN2022/086566, filed on Apr. 13, 2022, which claims priority to Chinese Patent Application No. 202110400663.2, filed on Apr. 14, 2021. All of the aforementioned applications are incorporated herein by reference in their entireties.

TECHNICAL FIELD

The present disclosure generally relates to capacitors, in particular to a glass-packaged ceramic feedthrough filter and a preparation method thereof.

BACKGROUND

A glass-packaged ceramic feedthrough filter is generally applicable to electronic products with high sealing requirements due to excellent sealing performance. A structural product includes the following steps: firstly, sintering and fixing a guide needle and a metal shell by using glass; meanwhile, reserving a certain space of non-sintered glass in the metal shell, wherein a reserved space serves as a follow-up welding disc-shaped multilayer ceramic capacitor; carrying out surface electroplating treatment on a sintered shell; putting a disc-shaped multilayer ceramic capacitor into a shell for welding with lead alloy solder, and cleaning a flux after welding; and finally, potting epoxy resin and curing.

The flux of the glass-packaged ceramic feedthrough filter is difficult to clean.

SUMMARY

According to some embodiments of the present disclosure, a glass-packaged ceramic feedthrough filter is provided.

The ceramic feedthrough filter of the glass package includes a guide needle and a metal shell sleeved in the middle of the guide needle; a bottom of the metal shell is fixed by a glass body and hermetically connected with the guide needle for packaging an end part of the metal shell; a containing cavity is formed in an upper part of the glass body and above an interior of the metal shell; a gasket sleeved on a guide needle is arranged above the glass body; a disc-shaped multilayer ceramic capacitor is sleeved on the guide needle above the gasket sleeved; a first gap is formed between a bottom of the disc-shaped multilayer ceramic capacitor and a top of the glass body; the disc-shaped multilayer ceramic capacitor is welded and fixed in the containing cavity; at least one second gap is formed between the disc-shaped multilayer ceramic capacitor and the inner wall of the metal shell or between an outer side of the guide needle; the first gap is communicated with the second gap; and a top of the disc-shaped multilayer ceramic capacitor is encapsulated by a pouring sealant.

Further, the glass body is fixed to the guide needle and the metal shell by sintering.

Further, a sum of thicknesses of the gasket sleeved and the disc-shaped multilayer ceramic capacitor is less than a height of the containing cavity.

Further, the gasket sleeved is a C-shaped notch gasket, and an inner diameter thereof is equivalent to an outer diameter of the guide needle.

Further, the gasket sleeved has a thickness of 0.05-0.5 mm.

Further, solder is provided between the inner hole of the center of the disc-shaped multilayer ceramic capacitor and the outer side of the guide pin for full welding and fixation.

Further, solder is partially filled between the disc-shaped multilayer ceramic capacitor and the interior wall of the metal shell, so that an unwelded area is formed with at least one second gap.

A preparation method for preparing a glass-packaged ceramic feedthrough filter includes the following steps:

S1: selecting a metal shell and a guide needle to encapsulate an end part of the metal shell by using a glass body, so that the other end is provided with a containing cavity that can accommodate a gasket sleeved and a disc-shaped multilayer ceramic capacitor;

S2: performing surface electroplating treatment on the encapsulated metal shell;

S3: selecting a C-shaped gasket sleeved whose inner diameter is equivalent to an outer diameter of the guide needle, and sleeving the guide needle above the glass body;

S4: selecting the disc-shaped multilayer ceramic capacitor to be sleeved on the guide needle above the gasket sleeved;

S5: coating flux in a gap between the guide needle and a central through hole of the disc-shaped multilayer ceramic capacitor and a gap between an outer side of the disc-shaped multilayer ceramic capacitor and an inner side of the metal shell;

S6: filling the gap between the guide needle and the central through hole of the disc-shaped multilayer ceramic capacitor for welding; partially inserting a solder in a circumferential direction at the gap between the outer side of the disc-shaped multilayer ceramic capacitor and the inner side of the metal shell for welding, so that the unwelded area is formed with at least one second gap;

S7: performing multiple flushes by using an organic solvent after welding, and an organic solvent enters the first gap through the second gap to effectively remove a residual flux in the first gap;

S8: encapsulating and curing a cleaned product by using a pouring sealant.

Further, in the step S7, the washing step is placing the disc-shaped multilayer ceramic capacitor after welding in an organic solvent for vacuumizing treatment; then soaked in the organic solvent for 20-30 minutes, finally drying the residual organic solvent in the interior of a centrifugal machine by using a centrifuge; repeating the above steps for 2-5 times, and using a new organic solvent for each soaking.

Further, the organic solvent is anhydrous ethanol or an organic solvent capable of dissolving flux.

Further, the pouring sealant is liquid epoxy resin, vacuum potting equipment is adopted, or the product is put into a vacuum box for exhausting treatment after being filled in an atmospheric environment, so that the liquid epoxy resin can flow into the first gap and the second gap for insulation sealing, and finally the liquid epoxy resin is cured to complete product manufacturing.

The beneficial effects obtained by the present disclosure are as follows:

A distance between the disc-shaped multilayer ceramic capacitor and the upper surface of the glass body is increased through the gasket sleeved, so that the size of the first gap is increased, the later organic solvent enters for bubble washing, the second gap is reserved between the disc-shaped multilayer ceramic capacitor and the inner side surface of the metal shell, so that the first gap is communicated with the second gap, so that the residual position of the soldering flux is conveniently and effectively cleaned, the residual problem of the soldering flux is effectively avoided, meanwhile, the structural design of the C-shaped gasket can facilitate the organic solvent to flow more freely between the first gaps, and the cleaning efficiency is improved.

BRIEF DESCRIPTION OF THE DRAWINGS

In order to more clearly illustrate the technical solutions of the embodiments of the present disclosure, the accompanying drawings required to be used in the embodiments are briefly described below, it should be understood that the following drawings show certain embodiments of the present disclosure, and therefore should not be regarded as limiting the scope, and for those skilled in the art, other related drawings may be obtained according to these drawings without creative work.

DETAILED DESCRIPTION OF THE EMBODIMENTS

Figure 1:
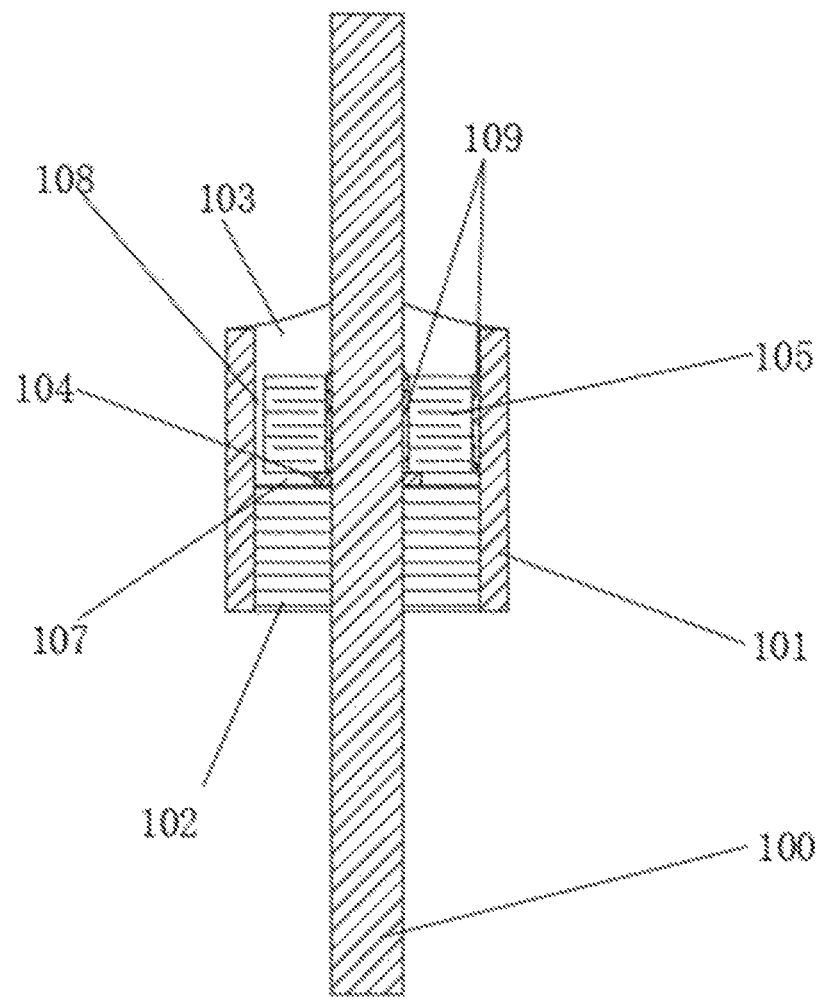
FIG. 1 is a welding cross-sectional view of a feedthrough filter.

In order to make the objectives, technical solutions and advantages of the embodiments clearer, the technical solutions in the embodiments will be clearly and completely described below with reference to the accompanying drawings in the embodiments. Obviously, the described embodiments are part of the embodiments, not all embodiments. All other embodiments obtained by those skilled in the art without creative efforts shall fall within the scope of the embodiments. Accordingly, the following detailed description of embodiments provided in the accompanying drawings is not intended to limit the scope of the claimed embodiments, but merely represents selected embodiments. All other embodiments obtained by a person of ordinary skill in the art without any creative effort on the basis of the embodiments in the present disclosure shall fall into the scope of the present disclosure.

In the description of the present disclosure, it should be noted that the orientation or positional relationship indicated by the terms "upper", "lower", "inner", "outer" "front end", "rear end", "two ends", "one end", and "another end" is based on the orientation or positional relationship shown in the drawings, and is merely for ease of description of the present disclosure and the simplified description, and is not intended to indicate or imply that the device or element referred to have a specific orientation, be constructed and operated in a specific orientation, and therefore cannot be understood as a limitation on the present disclosure. Furthermore, the terms "first" and "second" are for descriptive purposes and are not to be construed as indicating or implying relative importance.

In the description of the present disclosure, it should be noted that, unless specified and defined otherwise, the terms "mounted", "disposed", "connected", etc., should be understood broadly, for example, "connected", or may be fixedly connected, or may be detachably connected, or integrally connected; may be mechanical connection, or may be electrically connected; or may be directly connected, or may be indirectly connected through an intermediate medium, and may be in communication between two elements. For those skilled in the art, the specific meaning of the above terms in the present disclosure may be understood according to specific situations.

Embodiment

Figure 2:
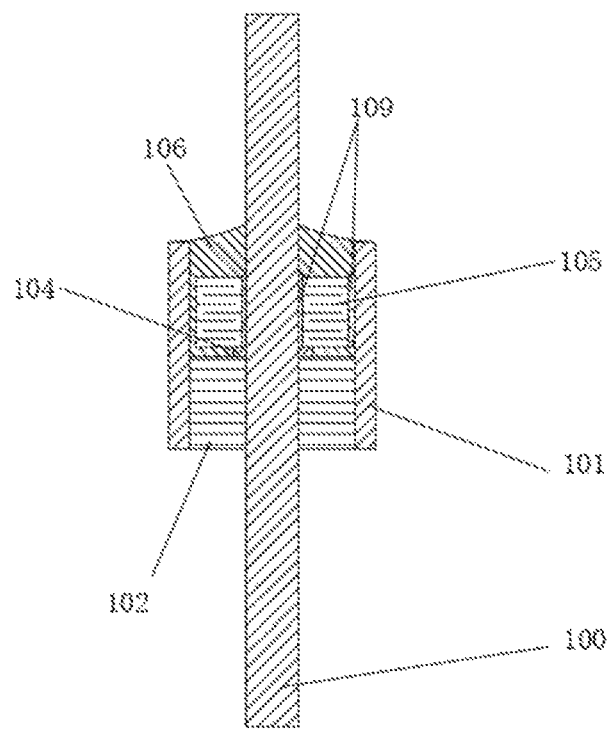
FIG. 2 is a sectional view of a feedthrough filter package.
Figure 3:
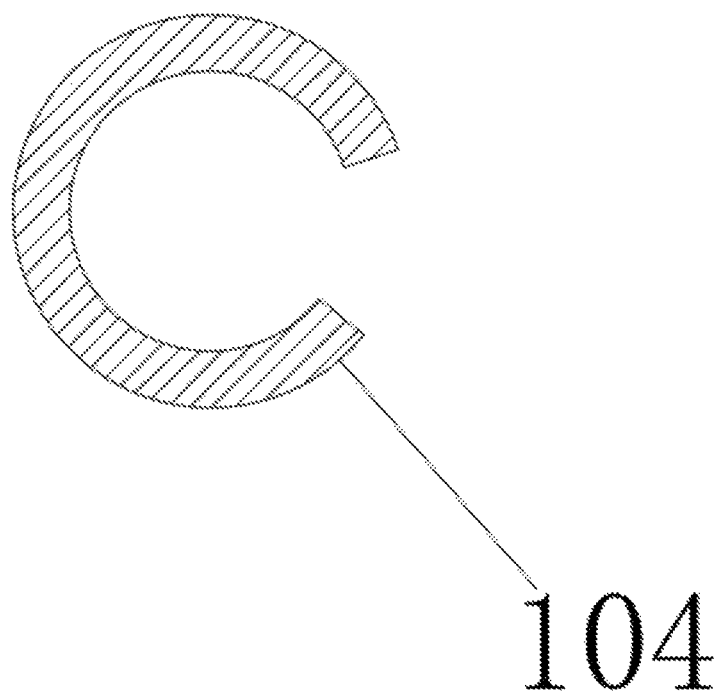
FIG. 3 is a schematic structural diagram of a gasket.

As shown in FIG. 1 to FIG. 3, A glass-packaged ceramic feedthrough filter, comprising a guide needle 100 and a metal shell 101 sleeved in the middle of the guide needle 100; a bottom of the metal shell 101 is fixed by a glass body 102 and hermetically connected with the guide needle 100 for packaging an end part of the metal shell 101; a containing cavity 103 is formed in an upper part of the glass body 102 and above an interior of the metal shell 101; a gasket sleeved 104 on a guide needle 100 is arranged above the glass body 102; a disc-shaped multilayer ceramic capacitor 105 is sleeved on the guide needle 100 above the gasket sleeved 104; a first gap 107 is formed between a bottom of the disc-shaped multilayer ceramic capacitor 105 and a top of the glass body 102; the disc-shaped multilayer ceramic capacitor 105 is welded and fixed in the containing cavity 103; at least one second gap 108 is formed between the disc-shaped multilayer ceramic capacitor 105 and the inner wall of the metal shell 101 or between an outer side of the guide needle 100; the first gap 107 is communicated with the second gap 108; and a top of the disc-shaped multilayer ceramic capacitor 105 is encapsulated by a pouring sealant 106.

In an embodiment of the present disclosure, the glass body 102 is fixed to the guide needle 100 and the metal shell 101 by sintering.

In an embodiment of the present disclosure, a sum of thicknesses of the gasket sleeved 104 and the disc-shaped multilayer ceramic capacitor 105 is less than a height of the containing cavity 103.

In an embodiment of the present disclosure, the gasket sleeved 104 is a C-shaped notch gasket, and an inner diameter thereof is equivalent to an outer diameter of the guide needle 100.

In an embodiment of the present disclosure, the height difference exists between the two end portions at the opening of the gasket sleeved 104, so that the distance between the disc-shaped multilayer ceramic capacitor 105 and the upper surface of the glass body 102 can be further improved, meanwhile, the flowing of the organic solvent is more convenient, and the size of the first gap 107 can be increased without increasing the thickness of the gasket sleeved 104.

In an embodiment of the present disclosure, the thickness of the gasket 104 is 0.05-0.5 mm. The thickness may be 0.1 mm.

In an embodiment of the present disclosure, the solder 109 is disposed between the inner hole of the center of the disc-shaped multilayer ceramic capacitor 105 and the outer side of the guide needle 100 for full welding and fixation, because a space of the position is small, if the space is used as the forming space of the second gap 108, the machining difficulty is relatively large, so that the machining difficulty can be reduced by full welding, and the cost is reduced.

In an embodiment of the present disclosure, the solder 109 is partially filled between the disk-shaped multilayer ceramic capacitor 105 and the inner wall of the metal shell 101, so that the unwelded region is formed with at least one second gap 108; the solder 109 is disposed at half along the circumferential gap between the disk-shaped multilayer ceramic capacitor 105 and the inner wall of the metal shell 101, and the solder 109 may be filled with one half of continuity, and half of the space remains as the second gap 108, so that the stability of the welding can be ensured, meanwhile, the sufficient size of the second gap 108 can be ensured, and the subsequent cleaning can be facilitated.

A preparation method for preparing a glass-packaged ceramic feedthrough filter includes the following steps:

S1: selecting a metal shell 101 and a guide needle 100 to encapsulate an end part of the metal shell 101 by using a glass body 102, so that the other end is provided with a containing cavity 103 that can accommodate a gasket sleeved 104 and a disc-shaped multilayer ceramic capacitor 105;

S2: performing surface electroplating treatment on the encapsulated metal shell 101;

S3: selecting a C-shaped gasket sleeved 104 whose inner diameter is equivalent to an outer diameter of the guide needle 100, and sleeving the guide needle 100 above the glass body 102;

S4: selecting the disc-shaped multilayer ceramic capacitor 105 to be sleeved on the guide needle 100 above the gasket sleeved 104;

S5: coating flux in a gap between the guide needle 100 and a central through hole of the disc-shaped multilayer ceramic capacitor 105 and a gap between an outer side of the disc-shaped multilayer ceramic capacitor 105 and an inner side of the metal shell 101;

S6: filling the gap between the guide needle 100 and the central through hole of the disc-shaped multilayer ceramic capacitor 105 for welding; partially inserting a solder 109 in a circumferential direction at the gap between the outer side of the disc-shaped multilayer ceramic capacitor 105 and the inner side of the metal shell 101 for welding, so that the unwelded area is formed with at least one second gap 108;

S7: performing multiple flushes by using an organic solvent after welding, and an organic solvent enters the first gap 107 through the second gap 108 to effectively remove a residual flux in the first gap 107;

S8: encapsulating and curing a cleaned product by using a pouring sealant 106;

Further, in the step S7, the washing step is placing the disc-shaped multilayer ceramic capacitor 105 after welding in an organic solvent for vacuumizing treatment; then soaked in the organic solvent for 20-30 minutes, finally drying the residual organic solvent in the interior of a centrifugal machine by using a centrifuge; repeating the above steps for 2-5 times, and using a new organic solvent for each soaking.

Further, the organic solvent is anhydrous ethanol or an organic solvent capable of dissolving flux.

Further, the pouring sealant 106 is liquid epoxy resin, vacuum potting equipment is adopted, or the product is put into a vacuum box for exhausting treatment after being filled in an atmospheric environment, so that the liquid epoxy resin can flow into the first gap 107 and the second gap 108 for insulation sealing, and finally the liquid epoxy resin is cured to complete product manufacturing.

The distance between the disk-shaped multilayer ceramic capacitor and the upper surface of the glass body is increased through the gasket sleeved, the size of the first gap is increased, the later organic solvent enters for bubble washing, the second gap is reserved between the disk-shaped multilayer ceramic capacitor and the inner side surface of the metal shell, so that the first gap is communicated with the second gap, so that the residual position of the soldering flux is conveniently and effectively cleaned, the residual problem of the soldering flux is avoided, meanwhile, the structural design of the C-shaped gasket sleeved facilitate the organic solvent to flow more freely between the first gaps, and the cleaning efficiency is improved.

The above description is only an embodiment of the present disclosure and is not intended to limit the present disclosure, and various modifications and changes may be made to those skilled in the art. Any modifications, equivalent substitutions and improvements made within the spirit and principle of the present disclosure should be included within the protection scope of the present disclosure.

What is claimed is:

1. A glass-packaged ceramic feedthrough filter, comprising a guide needle and a metal shell sleeved in the middle of the guide needle; a bottom of the metal shell is fixed by a glass body and hermetically connected with the guide needle for packaging an end part of the metal shell; a containing cavity is formed in an upper part of the glass body and above an interior of the metal shell; a C-shaped gasket sleeved on a guide needle is arranged above the glass body; a disc-shaped multilayer ceramic capacitor is sleeved on the guide needle above the C-shaped gasket; a first gap is formed between a bottom of the disc-shaped multilayer ceramic capacitor and a top of the glass body; the disc-shaped multilayer ceramic capacitor is welded and fixed in the containing cavity; at least one second gap is formed between the disc-shaped multilayer ceramic capacitor and the inner wall of the metal shell or between an outer side of the guide needle; the first gap is communicated with the second gap; and a top of the disc-shaped multilayer ceramic capacitor is encapsulated by a pouring sealant; and an inner diameter of the C-shaped gasket is equivalent to an outer diameter of the guide needle.

2. The glass-packaged ceramic feedthrough filter according to claim 1, wherein the glass body is fixed to the guide needle and the metal shell by sintering.

3. The preparation method of the glass-packaged ceramic feedthrough filter according to claim 2, comprising the following steps:

S1: selecting the metal shell and the guide needle to encapsulate an end part of the metal shell by using the glass body, so that the other end is provided with the containing cavity that accommodate the C-shaped gasket and the disc-shaped multilayer ceramic capacitor;

S2: performing surface electroplating treatment on the encapsulated metal shell;

S3: selecting the C-shaped gasket whose inner diameter is equivalent to an outer diameter of the guide needle, and sleeving the guide needle above the glass body;

S4: selecting the disc-shaped multilayer ceramic capacitor to be sleeved on the guide needle above the C-shaped gasket;

S5: coating flux in a gap between the guide needle and a central through hole of the disc-shaped multilayer ceramic capacitor and a gap between an outer side of the disc-shaped multilayer ceramic capacitor-and an inner side of the metal shell;

S6: filling the gap between the guide needle and the central through hole of the disc-shaped multilayer ceramic capacitor for welding; partially inserting a solder in a circumferential direction at the gap between the outer side of the disc-shaped multilayer ceramic capacitor-and the inner side of the metal shell for welding, so that an unwelded area is formed with the at least one second gap;

S7: performing multiple flushes by using an organic solvent after welding, and an organic solvent entering the first gap through the second gap to effectively remove a residual flux in the first gap; and S8: encapsulating and curing a cleaned product by using the pouring sealant.

4. The glass-packaged ceramic feedthrough filter according to claim 1, wherein a sum of thicknesses of the C-shaped gasket and the disc-shaped multilayer ceramic capacitor is less than a height of the containing cavity.

5. The preparation method of the glass-packaged ceramic feedthrough filter according to claim 3, comprising the following steps:

S1: selecting the metal shell and the guide needle to encapsulate an end part of the metal shell by using the glass body, so that the other end is provided with the containing cavity that accommodate the C-shaped gasket and the disc-shaped multilayer ceramic capacitor;

S2: performing surface electroplating treatment on the encapsulated metal shell;

S3: selecting the C-shaped gasket whose inner diameter is equivalent to an outer diameter of the guide needle, and sleeving the guide needle above the glass body;

S4: selecting the disc-shaped multilayer ceramic capacitor to be sleeved on the guide needle above the C-shaped gasket;

S5: coating flux in a gap between the guide needle and a central through hole of the disc-shaped multilayer ceramic capacitor and a gap between an outer side of the disc-shaped multilayer ceramic capacitor-and an inner side of the metal shell;

S6: filling the gap between the guide needle and the central through hole of the disc-shaped multilayer ceramic capacitor for welding; partially inserting a solder in a circumferential direction at the gap between the outer side of the disc-shaped multilayer ceramic capacitor-and the inner side of the metal shell for welding, so that an unwelded area is formed with the at least one second gap;

S7: performing multiple flushes by using an organic solvent after welding, and an organic solvent entering the first gap through the second gap to effectively remove a residual flux in the first gap; and S8: encapsulating and curing a cleaned product by using the pouring sealant.

6. The glass-packaged ceramic feedthrough filter according to claim 1, wherein the C-shaped gasket has a thickness of 0.05-0.5 mm.

7. The preparation method of the glass-packaged ceramic feedthrough filter according to claim 6, comprising the following steps:

S1: selecting the metal shell and the guide needle to encapsulate an end part of the metal shell by using the glass body, so that the other end is provided with the containing cavity that accommodate the C-shaped gasket and the disc-shaped multilayer ceramic capacitor;

S2: performing surface electroplating treatment on the encapsulated metal shell;

S3: selecting the C-shaped gasket whose inner diameter is equivalent to an outer diameter of the guide needle, and sleeving the guide needle above the glass body;

S4: selecting the disc-shaped multilayer ceramic capacitor to be sleeved on the guide needle above the C-shaped gasket;

S5: coating flux in a gap between the guide needle and a central through hole of the disc-shaped multilayer ceramic capacitor and a gap between an outer side of the disc-shaped multilayer ceramic capacitor-and an inner side of the metal shell;

S6: filling the gap between the guide needle and the central through hole of the disc-shaped multilayer ceramic capacitor for welding; partially inserting a solder in a circumferential direction at the gap between the outer side of the disc-shaped multilayer ceramic capacitor-and the inner side of the metal shell for welding, so that an unwelded area is formed with the at least one second gap;

S7: performing multiple flushes by using an organic solvent after welding, and an organic solvent entering the first gap through the second gap to effectively remove a residual flux in the first gap; and S8: encapsulating and curing a cleaned product by using the pouring sealant.

8. The glass-packaged ceramic feedthrough filter according to claim 1, wherein solder is provided between an inner hole in the center of the disc-shaped multilayer ceramic capacitor and the outer side of the guide needle for full welding and fixation.

9. The preparation method of the glass-packaged ceramic feedthrough filter according to claim 8, comprising the following steps:

S1: selecting the metal shell and the guide needle to encapsulate an end part of the metal shell by using the glass body, so that the other end is provided with the containing cavity that accommodate the C-shaped gasket and the disc-shaped multilayer ceramic capacitor;

S2: performing surface electroplating treatment on the encapsulated metal shell;

S3: selecting the C-shaped gasket whose inner diameter is equivalent to an outer diameter of the guide needle, and sleeving the guide needle above the glass body;

S4: selecting the disc-shaped multilayer ceramic capacitor to be sleeved on the guide needle above the C-shaped gasket;

S5: coating flux in a gap between the guide needle and a central through hole of the disc-shaped multilayer ceramic capacitor and a gap between an outer side of the disc-shaped multilayer ceramic capacitor-and an inner side of the metal shell;

S6: filling the gap between the guide needle and the central through hole of the disc-shaped multilayer ceramic capacitor for welding; partially inserting a solder in a circumferential direction at the gap between the outer side of the disc-shaped multilayer ceramic capacitor-and the inner side of the metal shell for welding, so that an unwelded area is formed with the at least one second gap;

S7: performing multiple flushes by using an organic solvent after welding, and an organic solvent entering the first gap through the second gap to effectively remove a residual flux in the first gap; and S8: encapsulating and curing a cleaned product by using the pouring sealant.

10. The glass-packaged ceramic feedthrough filter according to claim 8, wherein the solder is partially filled between the disc-shaped multilayer ceramic capacitor and the interior wall of the metal shell, so that an unwelded area is formed with the at least one second gap.

11. The preparation method of the glass-packaged ceramic feedthrough filter according to claim 10, comprising the following steps:

S1: selecting the metal shell and the guide needle to encapsulate an end part of the metal shell by using the glass body, so that the other end is provided with the containing cavity that accommodate the C-shaped gasket and the disc-shaped multilayer ceramic capacitor;

S2: performing surface electroplating treatment on the encapsulated metal shell;

S3: selecting the C-shaped gasket whose inner diameter is equivalent to an outer diameter of the guide needle, and sleeving the guide needle above the glass body;

S4: selecting the disc-shaped multilayer ceramic capacitor to be sleeved on the guide needle above the C-shaped gasket;

S5: coating flux in a gap between the guide needle and a central through hole of the disc-shaped multilayer ceramic capacitor and a gap between an outer side of the disc-shaped multilayer ceramic capacitor-and an inner side of the metal shell;

S6: filling the gap between the guide needle and the central through hole of the disc-shaped multilayer ceramic capacitor for welding; partially inserting a solder in a circumferential direction at the gap between the outer side of the disc-shaped multilayer ceramic capacitor-and the inner side of the metal shell for welding, so that the unwelded area is formed with the at least one second gap;

S7: performing multiple flushes by using an organic solvent after welding, and an organic solvent entering the first gap through the second gap to effectively remove a residual flux in the first gap; and S8: encapsulating and curing a cleaned product by using the pouring sealant.

12. A preparation method of the glass-packaged ceramic feedthrough filter according to claim 1, comprising the following steps:

S1: selecting the metal shell and the guide needle to encapsulate an end part of the metal shell by using the glass body, so that the other end is provided with the containing cavity that accommodate the C-shaped gasket and the disc-shaped multilayer ceramic capacitor;

S2: performing surface electroplating treatment on the encapsulated metal shell;

S3: selecting the C-shaped gasket whose inner diameter is equivalent to an outer diameter of the guide needle, and sleeving the guide needle above the glass body;

S4: selecting the disc-shaped multilayer ceramic capacitor to be sleeved on the guide needle above the C-shaped gasket;

S5: coating flux in a gap between the guide needle and a central through hole of the disc-shaped multilayer ceramic capacitor and a gap between an outer side of the disc-shaped multilayer ceramic capacitor-and an inner side of the metal shell;

S6: filling the gap between the guide needle and the central through hole of the disc-shaped multilayer ceramic capacitor for welding; partially inserting a solder in a circumferential direction at the gap between the outer side of the disc-shaped multilayer ceramic capacitor-and the inner side of the metal shell for welding, so that an unwelded area is formed with the at least one second gap;

S7: performing multiple flushes by using an organic solvent after welding, and an organic solvent entering the first gap through the second gap to effectively remove a residual flux in the first gap; and S8: encapsulating and curing a cleaned product by using the pouring sealant.

13. The preparation method of the glass-packaged ceramic feedthrough filter according to claim 12, wherein the rinsing step in the step S7 comprises:

placing the disc-shaped multilayer ceramic capacitor after welding in an organic solvent for vacuumizing treatment;

then soaking in the organic solvent for 20-30 minutes;

finally drying the residual organic solvent in the interior of a centrifugal machine by using a centrifuge;

repeating the above steps for 2-5 times, and using a new organic solvent for each soaking.

14. The preparation method of the glass-packaged ceramic feedthrough filter according to claim 13, wherein the organic solvent is anhydrous ethanol or an organic solvent capable of dissolving flux.

15. The preparation method of the glass-packaged ceramic feedthrough filter according to claim 12, wherein the organic solvent is anhydrous ethanol or an organic solvent capable of dissolving flux.

16. The preparation method of the glass-packaged ceramic feedthrough filter according to claim 12, wherein the pouring sealant is liquid epoxy resin, vacuum potting equipment is adopted, or the product is put into a vacuum box for exhausting treatment after being filled in an atmospheric environment, so that the liquid epoxy resin can flow into the first gap-and the second gap for insulation sealing, and finally the liquid epoxy resin is cured to complete product manufacturing.

* * * * *